United States Patent
Wakileh et al.

(10) Patent No.: US 9,134,496 B2
(45) Date of Patent: Sep. 15, 2015

(54) MODULAR PLUG AND PLAY CONNECTIVITY PLATFORM

(75) Inventors: George I. Wakileh, Batavia, IL (US); Owen B. Weikle, Hutchinson, MN (US); Brett I. Utesch, Olivia, MN (US); Tami J. Wentzlaff, Green Isle, MN (US)

(73) Assignee: Communication Systems, Inc., Hector, MN (US)

(*) Notice: Subject to any disclaimer, the term of this patent is extended or adjusted under 35 U.S.C. 154(b) by 307 days.

(21) Appl. No.: 13/476,554

(22) Filed: May 21, 2012

(65) Prior Publication Data

US 2012/0292096 A1 Nov. 22, 2012

Related U.S. Application Data

(60) Provisional application No. 61/488,006, filed on May 19, 2011.

(51) Int. Cl.
*H02G 3/08* (2006.01)
*G02B 6/44* (2006.01)

(52) U.S. Cl.
CPC ............ *G02B 6/4448* (2013.01); *G02B 6/445* (2013.01)

(58) Field of Classification Search
CPC ........... H02G 3/08; H02G 3/081; H02G 3/10; H01H 9/02; G02B 6/4441; G02B 6/4446; G02B 6/4478; G02B 6/445
USPC ................ 174/50, 520, 480, 481, 559, 17 R; 361/600, 601, 679.01, 679.02; 385/134, 135
See application file for complete search history.

(56) References Cited

U.S. PATENT DOCUMENTS

| | | | |
|---|---|---|---|
| 5,276,279 A * | 1/1994 | Brownlie et al. ............... 174/50 |
| 6,351,591 B1 * | 2/2002 | Daoud ......................... 385/135 |
| 6,600,866 B2 * | 7/2003 | Gatica et al. ................ 385/135 |
| 7,059,895 B2 * | 6/2006 | Murano ...................... 385/135 |
| 7,359,611 B1 * | 4/2008 | Kaplan ....................... 385/135 |
| 7,477,829 B2 * | 1/2009 | Kaplan ....................... 385/134 |
| 7,600,720 B2 * | 10/2009 | Vogel et al. ................. 385/135 |
| 7,737,360 B2 * | 6/2010 | Wiemeyer et al. ............ 174/50 |
| 7,816,602 B2 * | 10/2010 | Landry et al. ................. 174/50 |
| 7,893,362 B2 * | 2/2011 | Feng et al. .................... 174/50 |
| 7,916,458 B2 * | 3/2011 | Nelson et al. ................. 174/50 |
| 8,086,084 B2 * | 12/2011 | Bran de Leon et al. ...... 385/135 |
| 8,107,785 B2 * | 1/2012 | Berglund et al. ............ 385/135 |
| 8,476,540 B2 * | 7/2013 | Dahl et al. .................. 174/520 |

* cited by examiner

*Primary Examiner* — Angel R Estrada
(74) *Attorney, Agent, or Firm* — John D. Veldhuis-Kroeze; Westman, Champlin & Koehler, P.A.

(57) ABSTRACT

Disclosed are exemplary embodiments of a modular plug and play connectivity platform, system and method. The disclosed modular plug and play connectivity platform provides a convergent/distribution/conversion point for multiple services and transmission mediums. In exemplary embodiments, the platform includes a base plate configured to be mounted on a wall in a premises over a junction box and to support one or more data distribution or conversion modules. An interchangeable plate is securable to the base plate and provides interfaces for the one or more data distribution or conversion modules. A cover is securable to the base plate and forms an enclosure coving any data distribution or conversion modules supported by the base plate.

14 Claims, 16 Drawing Sheets

MODULAR PLUG AND PLAY CONNECTIVITY PLATFORM

REFERENCE TO RELATED CASE

The present application is based on and claims the priority of provisional application Ser. No. 61/488,006, filed on May 19, 2011, the contents of which are hereby incorporated by reference in their entirety.

BACKGROUND

In home and business environments which utilize telephone (voice), internet (data) and television or other video services, it is becoming increasingly common for traditional providers of one of the services to offer all three of the services. These "triple play" providers provide internet or other data access and communication, video transmission and/or reception, and voice communications. Typically, the data for these services is transmitted to and from the premises using one communication medium, and then the signals are distributed to various locations and/or converted for various systems at the premises.

In providing "triple play" and other bundled data services, it is common to have video splitters and similar devices located at a distribution point. Often times, the premises were not constructed with triple play services in mind, and there is not a convenient distribution point defined. The distribution and/or conversion devices may be difficult to arrange given existing telephone jack, cable jack, power outlet or other device locations. Placement of the distribution and/or conversion devices may be disorganized, not aesthetically pleasing, and inconvenient for purposes of protecting the devices from damage.

In some triple play services, the provider is delivering its content via optical fiber and installing the optical network terminal (ONT) on the inside of the premise. In this particular installation, fiber optic cable is needed to be routed inside the living unit directly to the ONT. This fiber optic cable can be installed inside the walls, or on the outside of the walls. In either installation, there is a potential for excess fiber optic cable that needs to be properly managed.

The discussion above is merely provided for general background information and is not intended to be used as an aid in determining the scope of the claimed subject matter.

SUMMARY

Disclosed embodiments of a modular plug and play connectivity platform address above-described or other problems in the prior art in accommodating various types of network or data cables and transmission mediums. For example, disclosed embodiments can be used to facilitate triple play service with delivery of content via optical fiber and an ONT, or with delivery of content using other types of communication medium. Some disclosed embodiments enable the storage of this excess network or data cable (e.g., fiber optic cable), as well as adapters (e.g., a fiber optic adapter) and various plug-in modules to handle cable and twisted pair distribution. Exemplary embodiments are configured to facilitate mounting over an existing junction box (coaxial or twisted pair), and to serve as an access point to these mediums as well.

In exemplary embodiments, the platform includes a base plate configured to be mounted on a wall in a premises over a junction box and to support one or more data distribution or conversion modules. An interchangeable plate is securable to the base plate and provides interfaces for the one or more data distribution or conversion modules. A cover is securable to the base plate and forms an enclosure coving any data distribution or conversion modules supported by the base plate.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
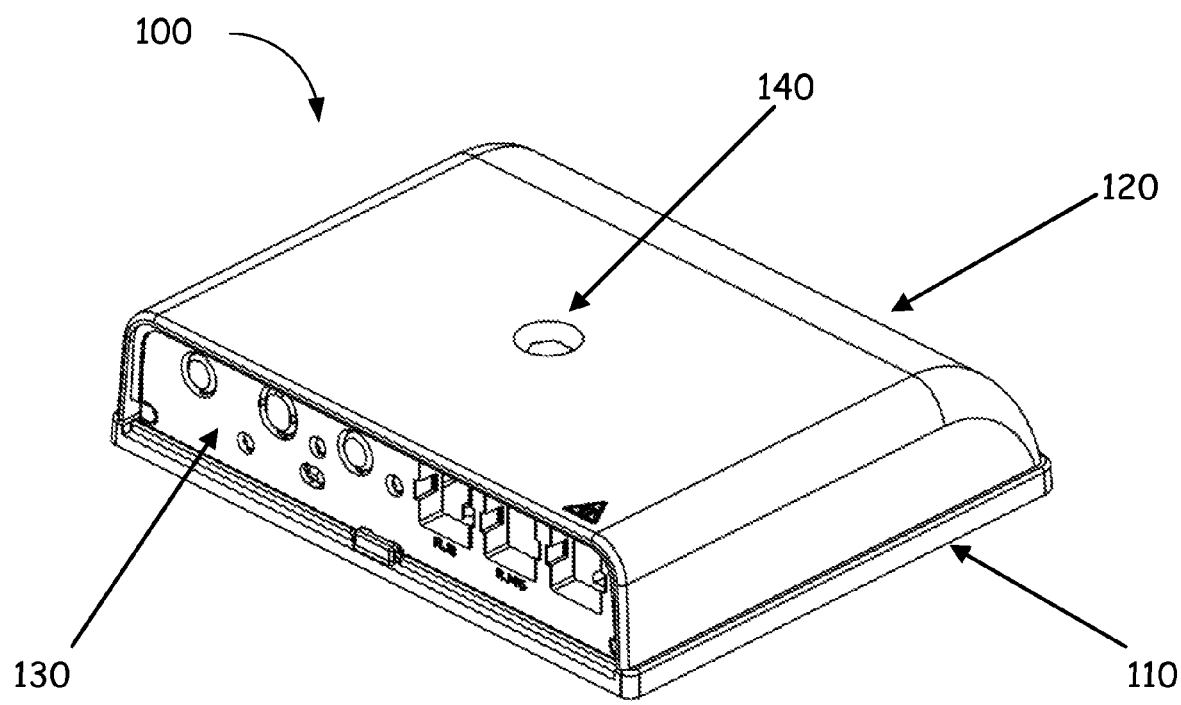
FIG. 1 is a perspective view of a modular plug and play connectivity platform in accordance with example embodiments.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

A modular plug and play connectivity platform is disclosed for providing a convergent/distribution/conversion point for multiple services and transmission mediums. In exemplary embodiments, the transmission mediums can comprise, but are not limited to, twisted pair (1 pair-4 pair), coaxial cable, and optical fiber (plastic or glass). The multiple services can comprise, but are not limited to, Ethernet, home phone network association (HPNA), home phone over coax network association (HCNA), G.hn, the multimedia over coax alliance (MoCA), video and including internet protocol television (IPTV), and optical fiber services.

The modular plug and play platform described below with regard to exemplary embodiments is configured to accept multiple modules for the purpose of distribution of signals and/or conversion to another transmission medium. The modules, which are configured to be coupled to the connectivity platform and to interchangeable plates to accommodate various configurations, can be passive or active. In other words, the modules can actively convert the signals from one type to another using a powered module (active), or the modules can passively split the signals (passive) onto multiple different data cables, etc. Using various combinations of modules with the platform makes it highly configurable for the specific and changing needs of particular users.

Passive modules can comprise copper connectivity (twisted pair), HPNA diplexer, HPNA diplexer with balun, video splitters, fiber adapters, and plastic optical fiber (POF) connectors. The active modules can comprise POF 1×N switch (N=number of ports), Ethernet 1×N switch, for example. Other passive and active module types can also be used with the connectivity platform.

As discussed above, in some triple play services, the service provider delivers content via optical fiber and the installation of an optical network terminal (ONT) on the inside of the premise. In this particular installation, fiber optic cable is needed to be routed inside the living unit directly to the ONT. This fiber optic cable can be installed inside the walls, or on the outside of the walls. In either installation, there is a potential for excess fiber optic cable that needs to be properly managed. The modular plug and play connectivity platform is configured to provide storage of this excess fiber optic cable, as well as a fiber optic adapter and various plug-in modules to handle cable and twisted pair distribution. As will be discussed, the connectivity platform is configured to be mounted in a variety of different locations, including over top of an existing junction box (coaxial or twisted pair) such that the connectivity platform can serve as an access point to these mediums as well.

Referring now to FIG. 1, shown is an example embodiment of the modular plug and play connectivity platform 100. To facilitate mounting in a variety of locations, the connectivity platform 100 comprises a base plate 110 and a corresponding cover 120. An interchangeable plate 130 is configured to secure to the base plate to accommodate different modules and/or connectors for various desired usages of the platform. A variety of different interchangeable plate designs, each accommodating different modules, connectors or combinations thereof, can be attached to base plate 110. This makes connectivity platform 100 highly configurable for various desired uses and installations. In the example shown in FIG. 1, interchangeable plate 130 has video splitter and modular openings for accommodating video splitters and modular jacks and or fiber adapters. One or more cover security screws 140 are included in exemplary embodiments to prevent tampering, damage to modules, etc.

Figure 2:
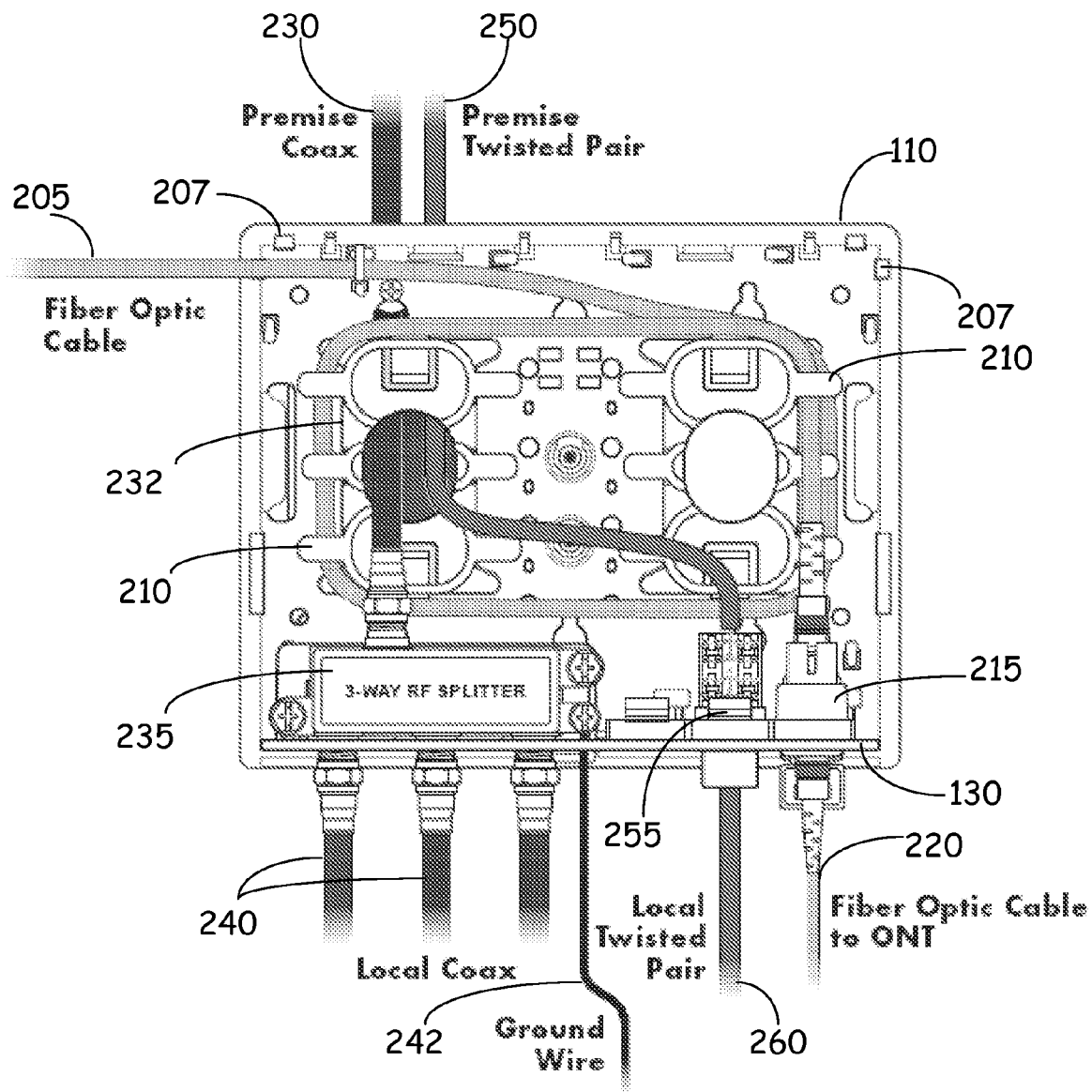
FIG. 2 is an illustration of a base plate of the connectivity platform of FIG. 1 in accordance with an example installation.

Referring now to FIG. 2, shown is base plate 110 of platform 100 with cover 120 removed to illustrate an example installed configuration of the platform. In this example, fiber optic cable 205 from the service provider enters platform 110 through one of multiple knockouts 207 in base plate 110 and is routed around the fiber spools 210 for storage of excess cable. The fiber optic cable 205 then terminates at a fiber adapter 215 installed into the interchangeable plate 130 which snaps into the base plate 110. A fiber optical cable 220 connected to the ONT can then be connected to adapter 215 for delivery of the service provider content. In addition to housing the fiber optic cable 205 connections to the ONT and facilitating convenient storage of excess cable, platform 100 also accommodates existing premise coax cable 230 and existing premise twisted pair cable 250. With base plate 110 mounted over an existing junction box, these cables can enter into platform 100 through an entry/exit aperture 232. In this illustrated embodiment, a video splitter 235 is mounted to interchangeable plate 130 for this particular configuration. Local coax cables 240 and a ground wire 242 connect to video splitter 235 to facilitate distribution of the premise coax to multiple different locations through the multiple local coax cables. A twisted pair connector 255 also interfaces with plate 130 to facilitate connection of premise twisted pair cable 250 to local twisted pair cable 260.

Figure 3:
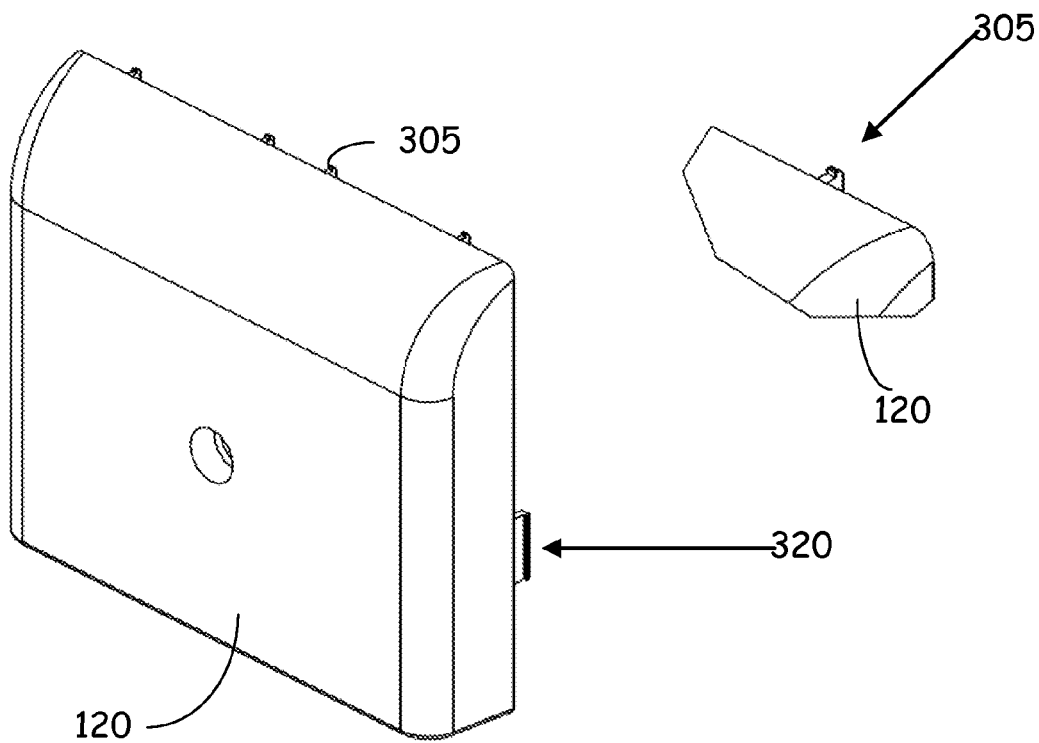
FIG. 3 is a perspective view illustration of a cover of the connectivity platform in accordance with an example embodiment.
Figure 4:
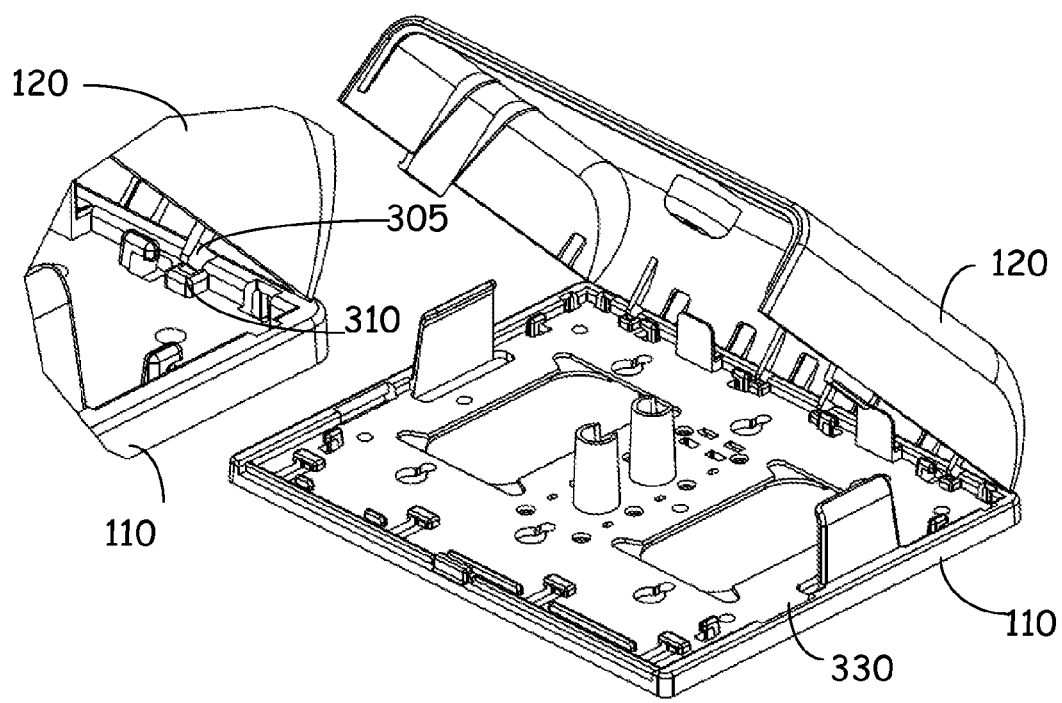
FIG. 4 is a perspective view illustration of the cover and base plate showing a hinged connection in an example embodiment.
Figure 5:
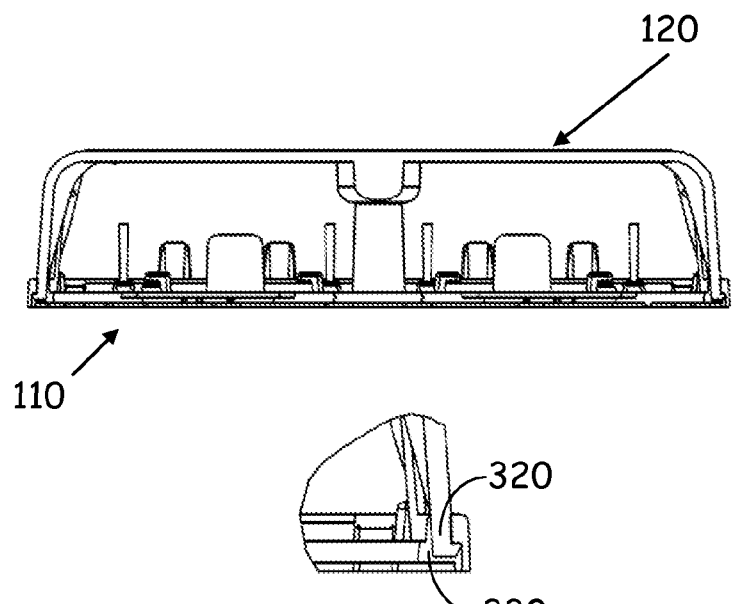
FIG. 5 is a diagrammatic bottom view illustration of the cover and base plate illustrating latching tabs in accordance with an example embodiment.

Referring now to FIGS. 3-5, shown in further detail are features which removably secure cover 120 to base plate 110 in a manner which allows convenient access by an installer. Cover 120 includes hinged tabs 305 which slide into openings 310 in base plate 110 to facilitate hinged movement of cover 120 relative to the stationary mounted base plate 110. Also, latching tabs 320 are formed in sides of the cover 120 to latch into openings 330 in base plate 110. This provides a latched securing mechanism which maintains cover 120 in a closed position over base plate 110. When not locked closed using a cover security screw (see FIG. 1), the latches can be released and cover 120 can be rotated upward to an open position by applying pressure to the sides of cover 120 before lifting.

Figure 6:
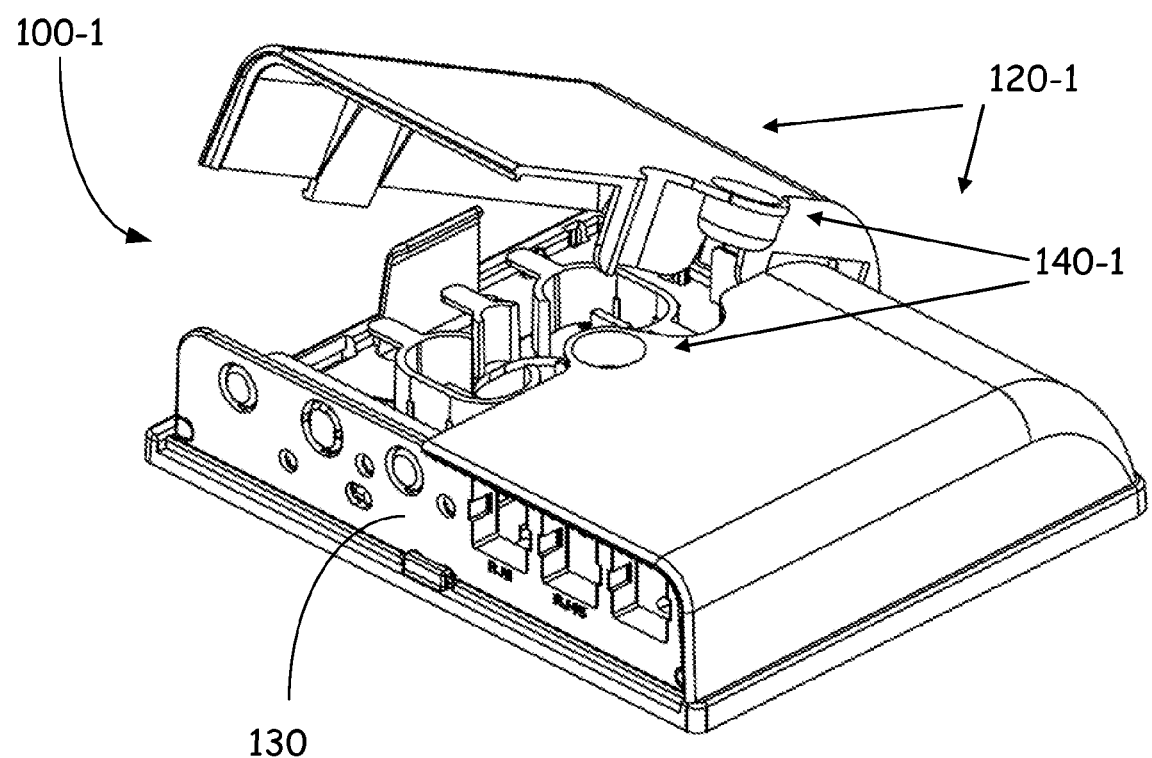
FIG. 6 is a perspective view of a modular plug and play connectivity platform having an alternate dual cover design in accordance with another example embodiment.

Referring now to FIG. 6, shown is an alternate embodiment of the modular plug and play connectivity platform. Connectivity platform 100-1 differs from platform 100 in that cover 120-1 is a dual cover design. Each of the separate cover portions 120-1 has its own security screw 140-1, such that each cover portion can be opened independently of the other, allowing greater flexibility in configuring the connectivity platform, while protecting installed modules, connectors, etc.

Figure 7:
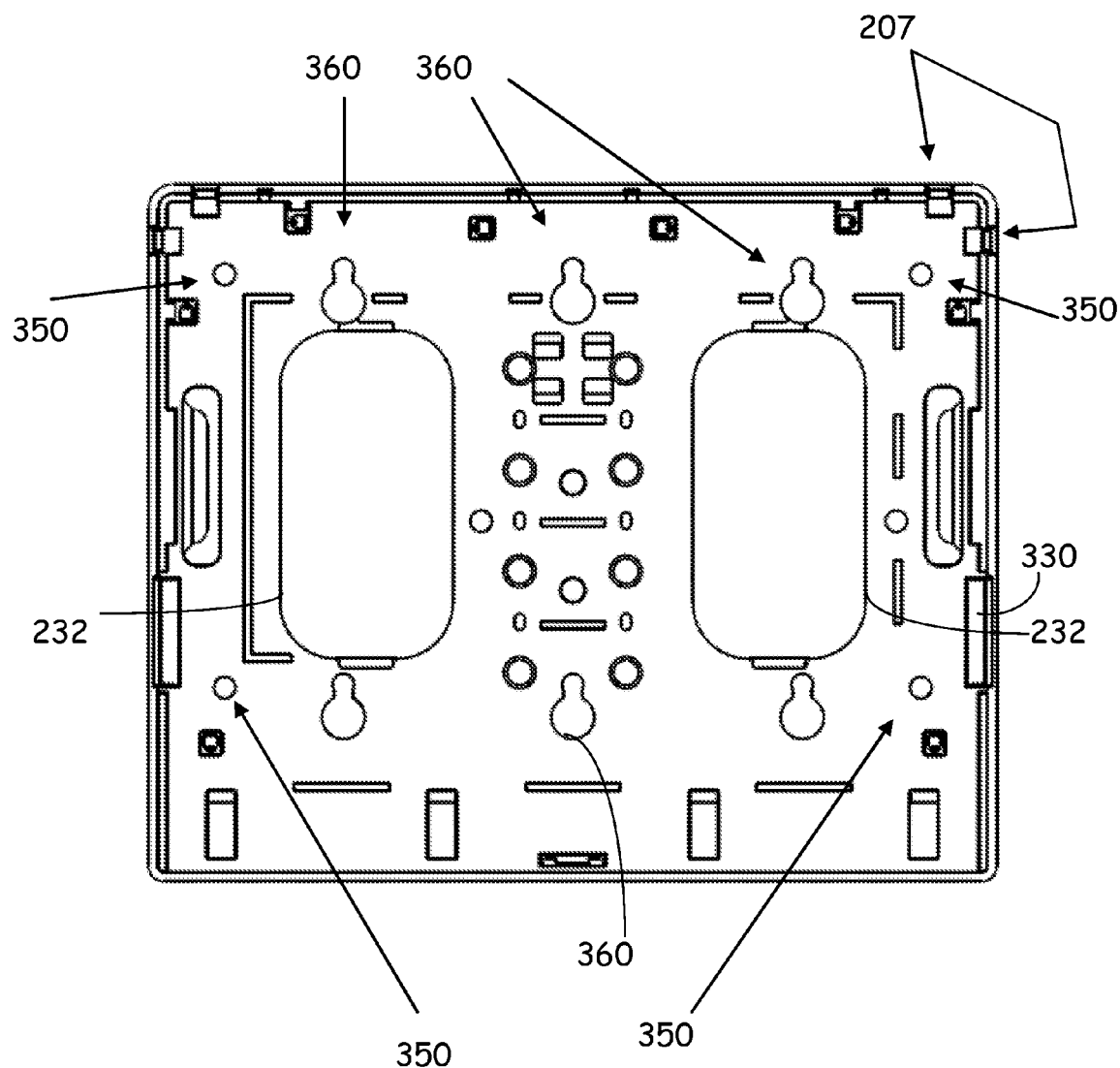
FIG. 7 is a back view illustration of the base plate in accordance with an example embodiment showing further features.

Referring now to FIG. 7, shown is an embodiment of base plate 110 which illustrates various features in greater detail. As discussed, base plate 110 is configured to be mounted to a wall or flush mounted to a surface over an existing junction box. To provide this versatility, base plate 110 includes mounting apertures 360 in a junction box mounting pattern such that base plate can be placed over the junction box screws and slid downward into a secured position. The junction box screws can then be tightened to further secure the base plate 110 over the junction box. Entry/exit apertures 232 in the base plate then allow the premise coax cables, twisted pair cables, or other data cables to be routed into and out of the connectivity platform. While junction box mounting is facilitated with platform 100, base plate 110 can be mounted to a wall or other surface using alternate or additional mounting apertures 350. Also, shown in FIG. 7 is knockouts 207 through which cables can be routed into and/or out of the connectivity platform, and latch openings 330 described above.

Figure 8:
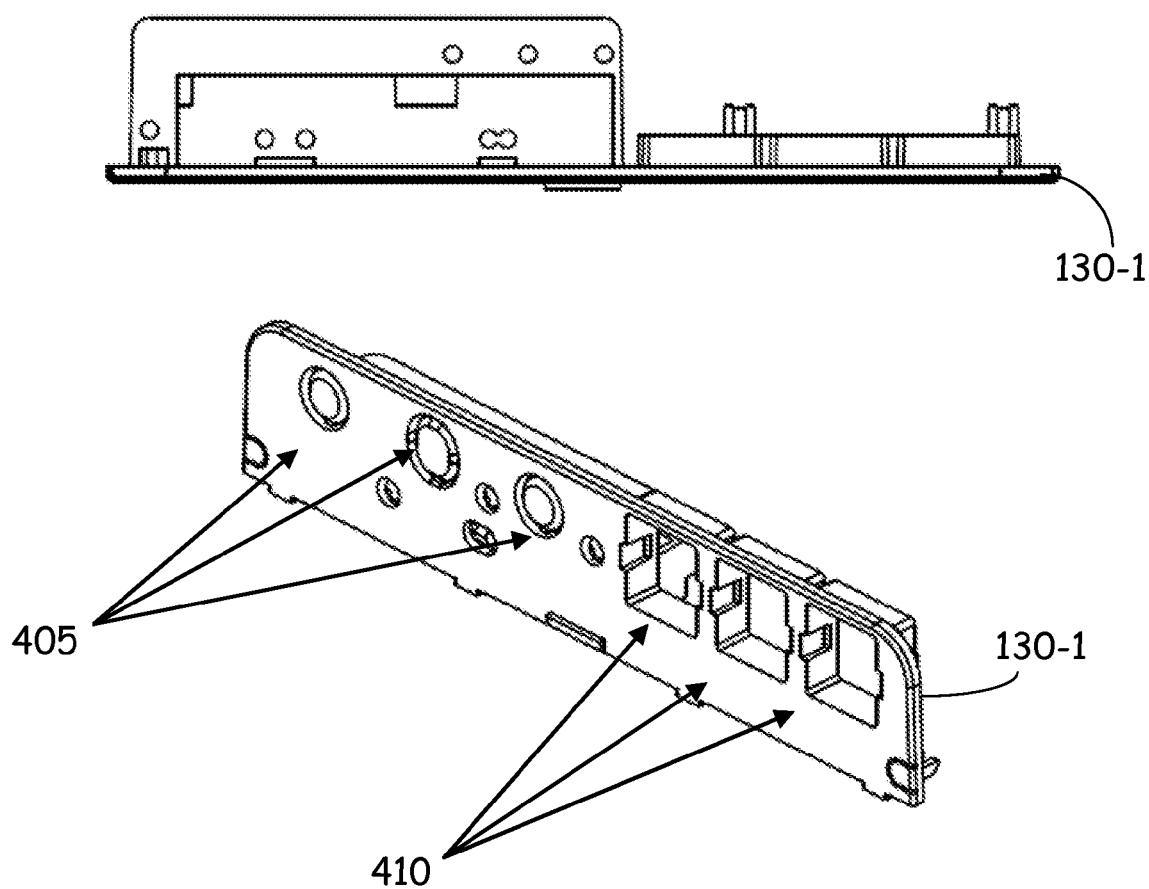
FIG. 8 shows top and perspective views of an interchangeable plate which is connectable to the base plate of the connectivity platform.
Figure 9:
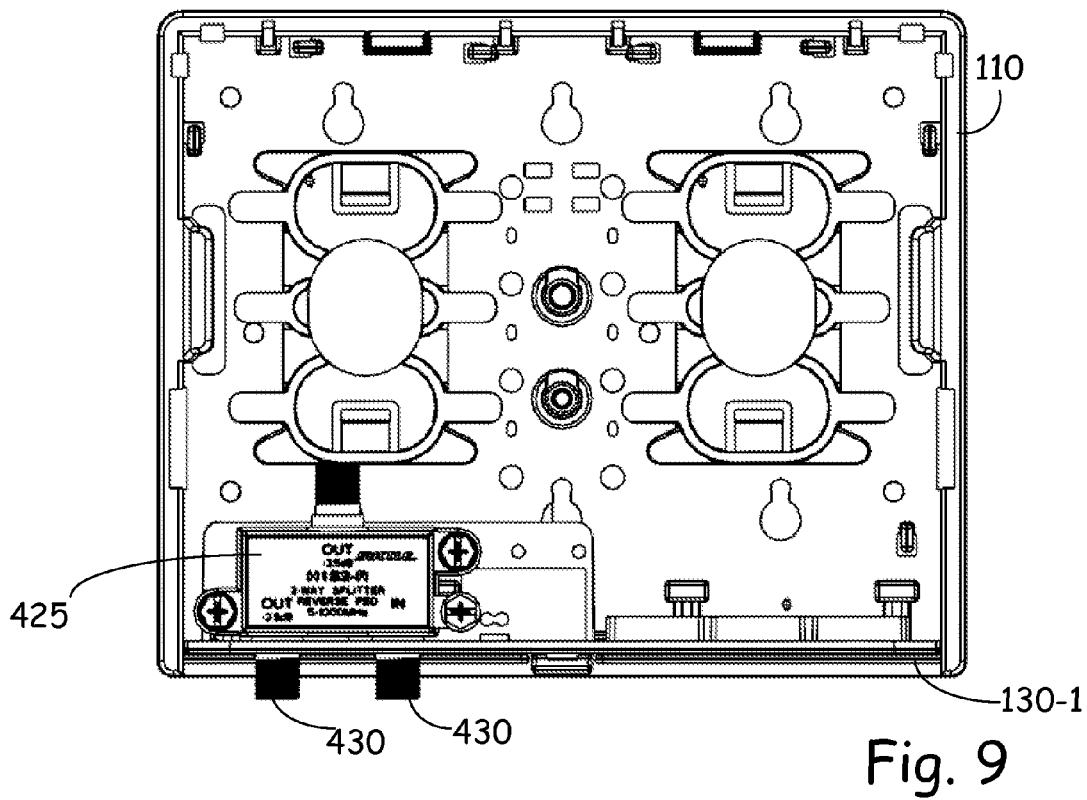
FIGS. 9-12 are illustrations of various example modules installed on the base plate of the connectivity platform.
Figure 10:
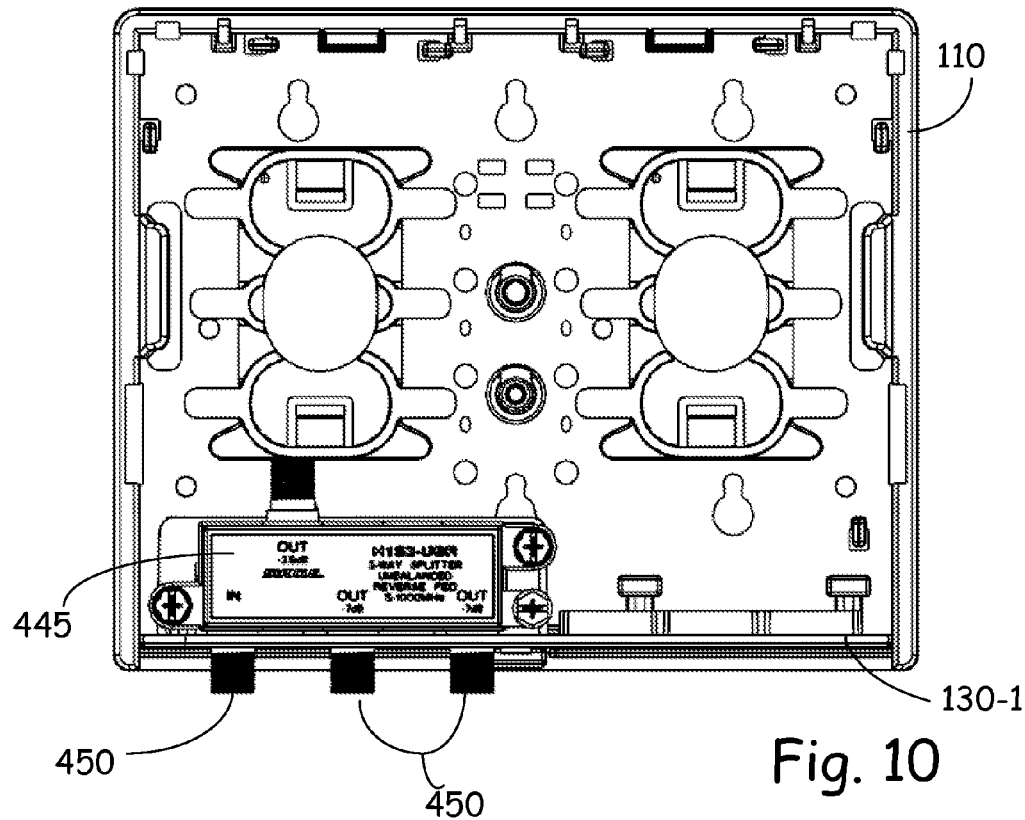
Figure 11:
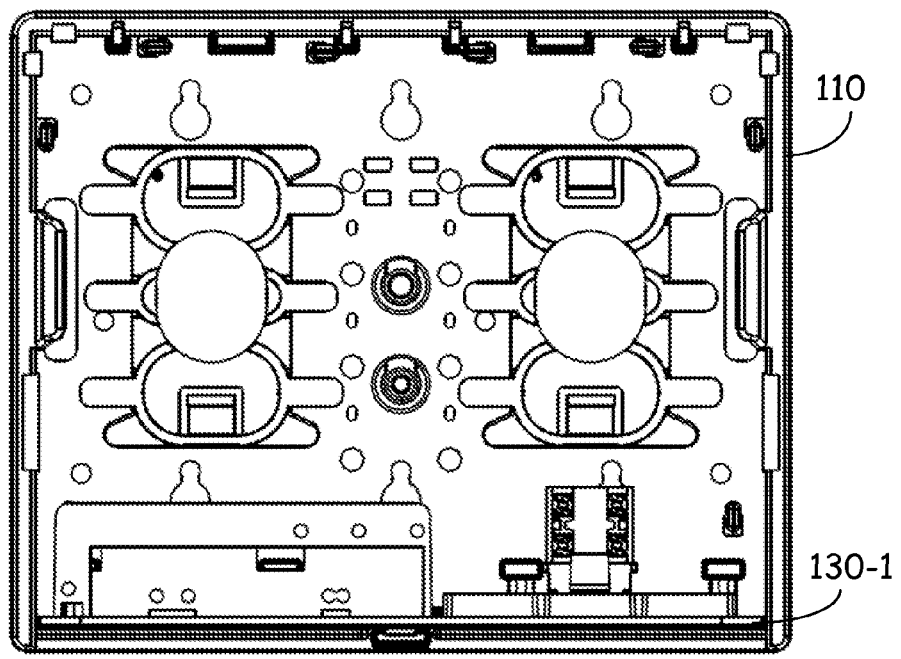
Figure 12:
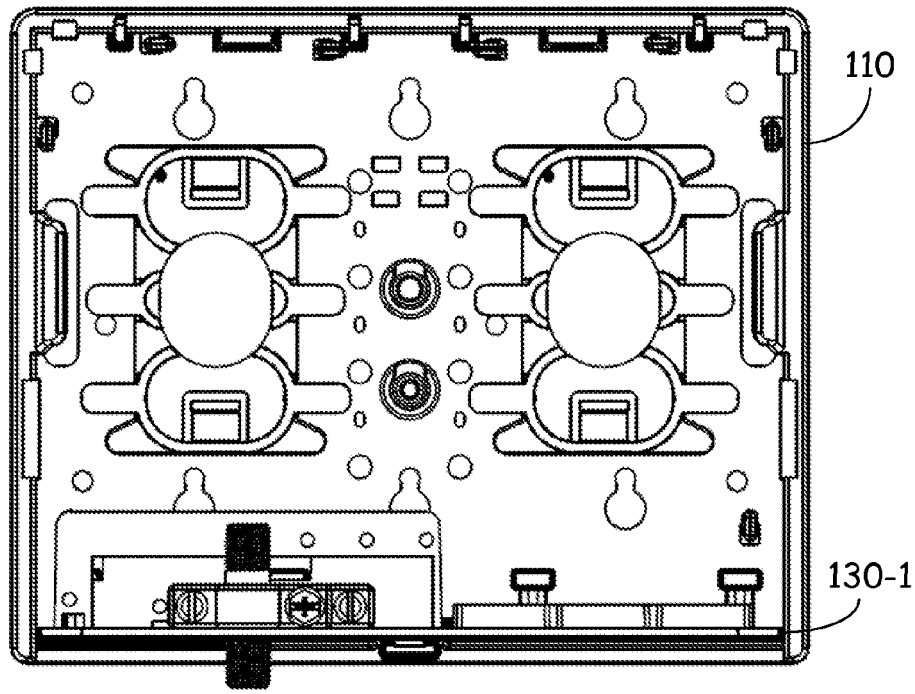

Referring now to FIG. 8, shown is a more particular embodiment of an interchangeable plate 130 which is configured to be coupled to base plate 110 for certain types of installations. Interchangeable plate 130-1, shown in top and perspective views in FIG. 8, includes knockouts or apertures 405 for video splitters or ground lugs, as well as three modular openings/apertures 410 which receive modular jacks and or fiber adapters. FIGS. 9-12 illustrate example connectivity platform configurations using interchangeable plate 130-1. FIGS. 9 and 10 illustrate connectivity platform 110 and interchangeable plate 130-1 with video splitters mounted on the interchangeable plate. In FIG. 9, a two-way video splitter 425 is mounted on interchangeable plate 130-1, with connectors 430 extending through knockouts or apertures 405 shown in FIG. 8. In FIG. 10, a three-way video splitter 445 is mounted on interchangeable plate 130-1, with connectors 450 extending through knockouts or apertures 405 shown in FIG. 8. FIG. 11 illustrates a configuration using plate 130-1 in which a modular jack 460 is installed on interchangeable plate 130-1. FIG. 12 illustrates yet another embodiment in which a coaxial ground lug 470 is installed on interchangeable plate 130-1. Thus, it can be seen that not only does the ability to change between different interchangeable plate configurations provide configurability and a wide range of uses for platform 100, but many of the interchangeable plates themselves provide great flexibility in implementing different configurations of the platform.

Figure 13:
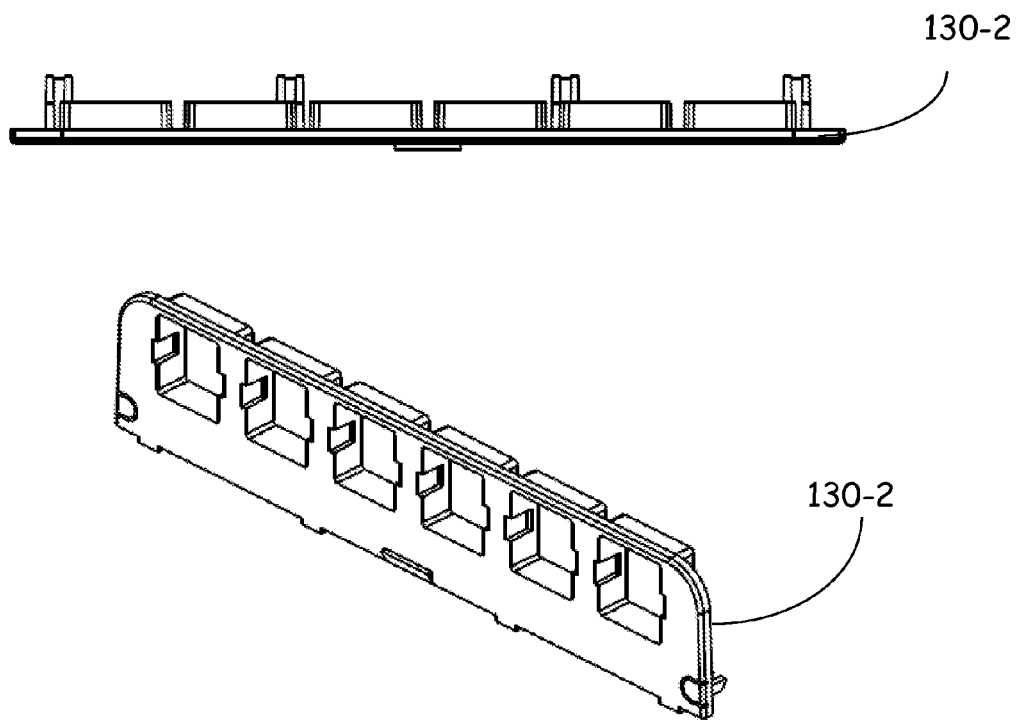
FIGS. 13 and 14 show top and perspective views of alternate types of interchangeable plates and the latching/attaching mechanisms which connect the plates to the base plate of the connectivity platform in some example embodiments.
Figure 14:
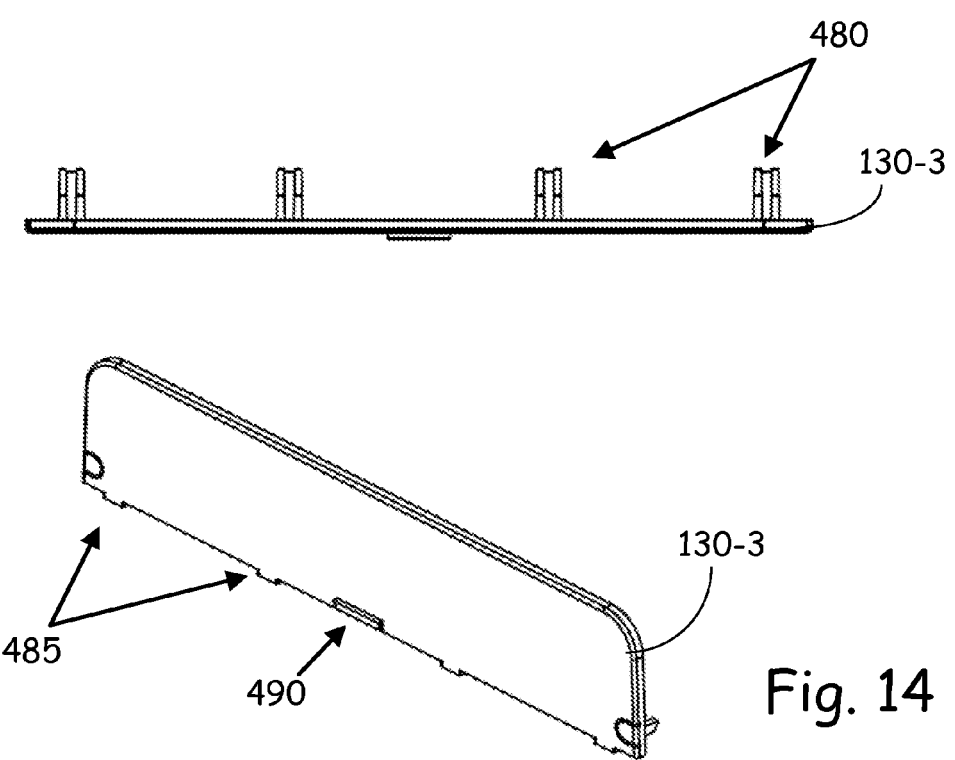

FIGS. 13 and 14 illustrate further example embodiments of interchangeable plate 130. FIG. 13 illustrates top and perspective views of a six modular opening plate 130-2. FIG. 14 illustrates top and perspective views of a blank plate 130-3 which does not have any openings or apertures. Plate 130-3 is particularly useful when no modules are mounted in platform 100 or when modules which do not require connectors to exit the platform are used. Also shown in FIG. 14 are features which all interchangeable plates can utilize to attach the plates to the base plate 110. These features include tabs 480 and 485, and latch 490. These features are described in greater detail with reference to FIGS. 19 and 20.

FIGS. 15-19 illustrate various interchangeable plates with examples of active modules 500-1 through 500-4 of types which require a power source to convert data signals between different transmission media. A power plug 510, and corresponding aperture in the interchangeable plates, is included in each module to receive an external source of power. For example, the power plug can be coupled to a transformer power source which provides a constant DC voltage output to power the active components of the module.

Figure 15:
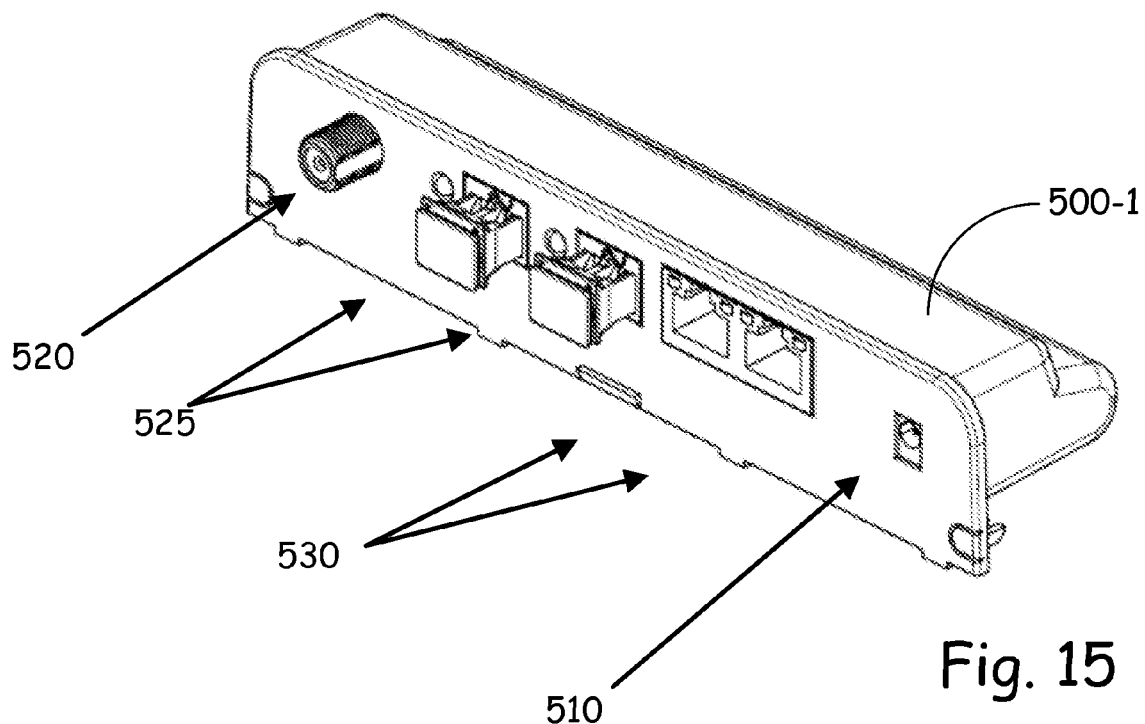
FIGS. 15-18 are illustrations of various active module configurations aligned with various interchangeable plate designs.
Figure 16:
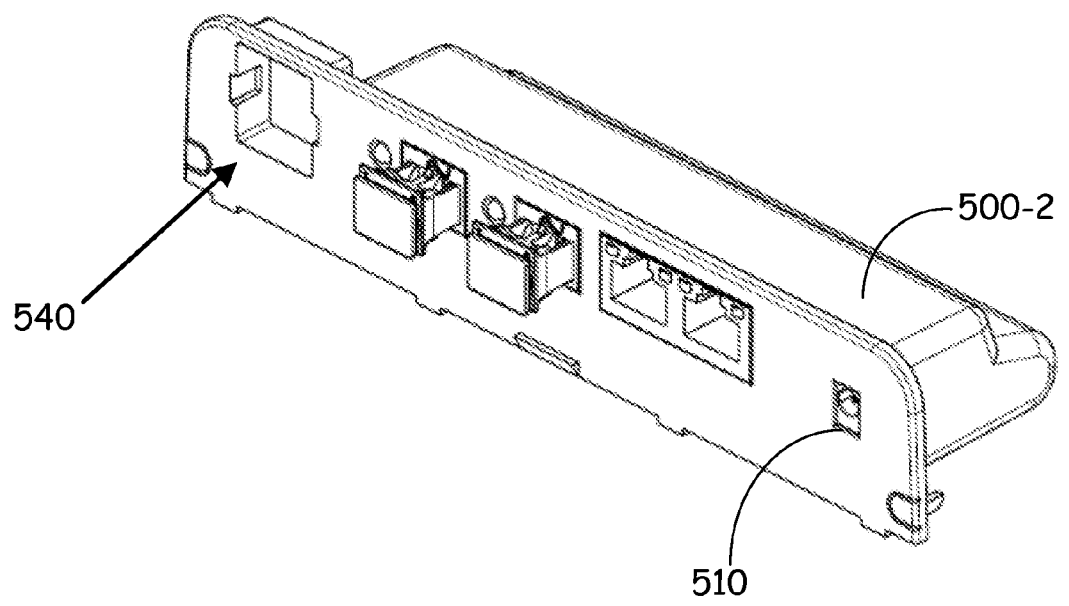

In FIG. 15, module 500-1 includes a coax cable connector 520, two POF connectors 525, and two Ethernet connectors 530. Module 500-1 has internal circuitry configured to convert and switch the signals between the POF connectors, the Ethernet connectors, and coax connector. In FIG. 16, module 500-2 includes a similar configuration, but has a pass through modular opening 540 in the interchangeable plate instead of the coax port illustrated in FIG. 15.

Figure 17:
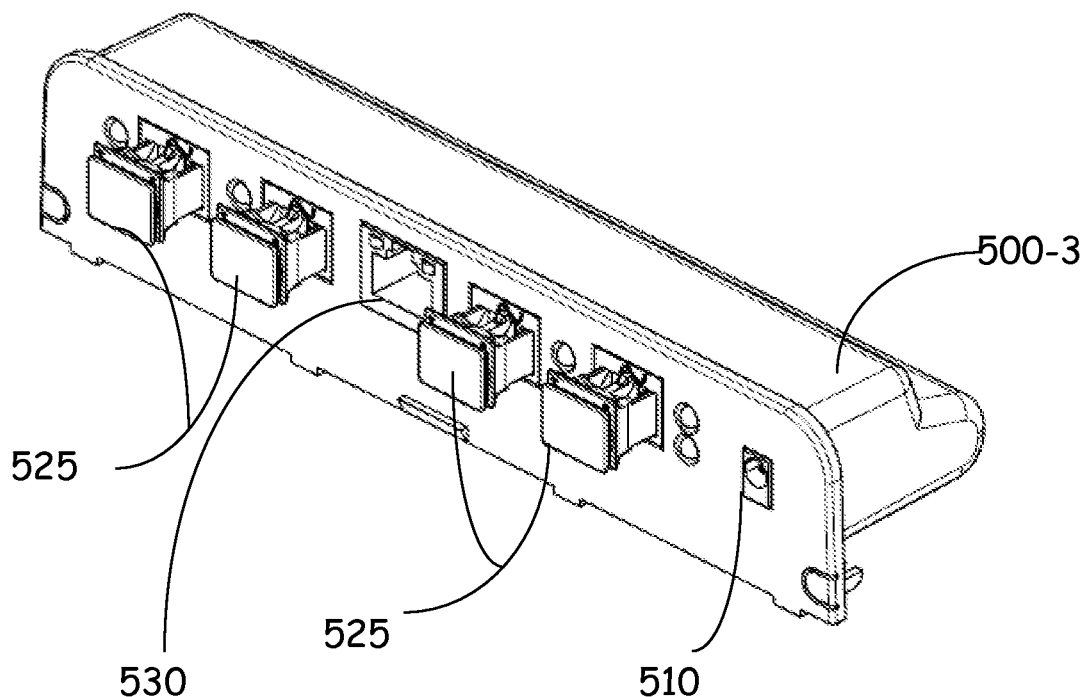
Figure 18:
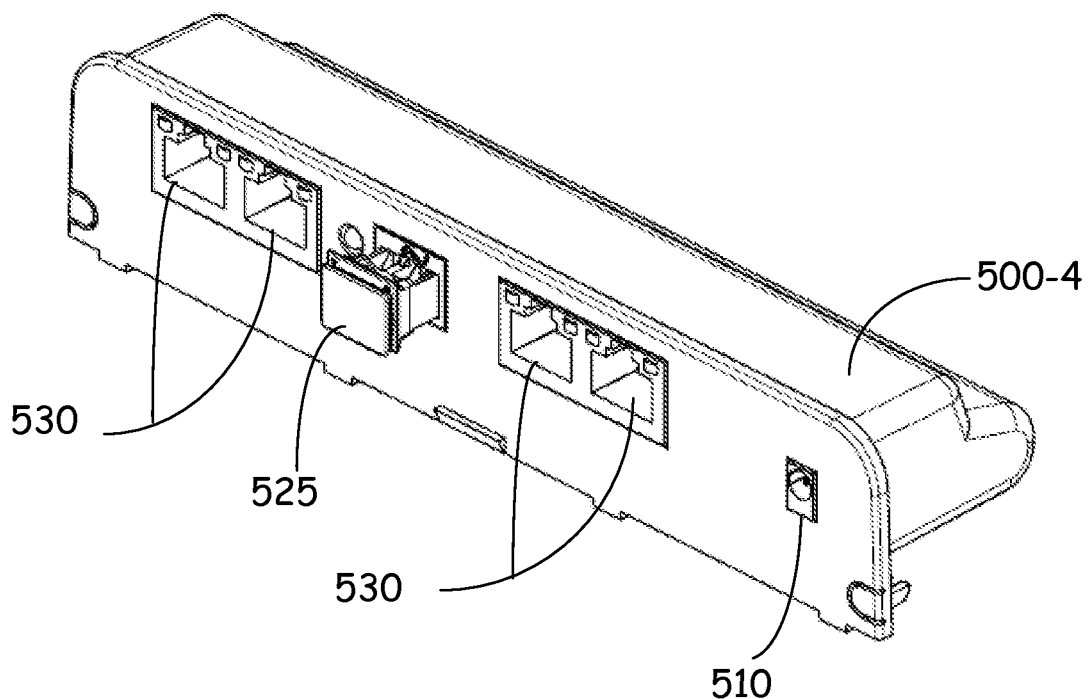

In FIG. 17, module 500-3 is shown to have four POF connectors 525, but only a single Ethernet port 530. In this example, a single Ethernet connection is converted/switched and distributed to four separate optical fiber connections. In contrast, in module 500-4 shown in FIG. 18, a single POF connector 525 is provided, but four Ethernet ports 530 are available. Thus, a single fiber optical cable connection is converted/switched and distributed to four separate Ethernet connections. As can be seen by these example embodiments, platform 100 and its various modules and interchangeable plates provide a highly configurable and adaptable connectivity apparatus for triple play service providers or for other purposes.

Figure 19:
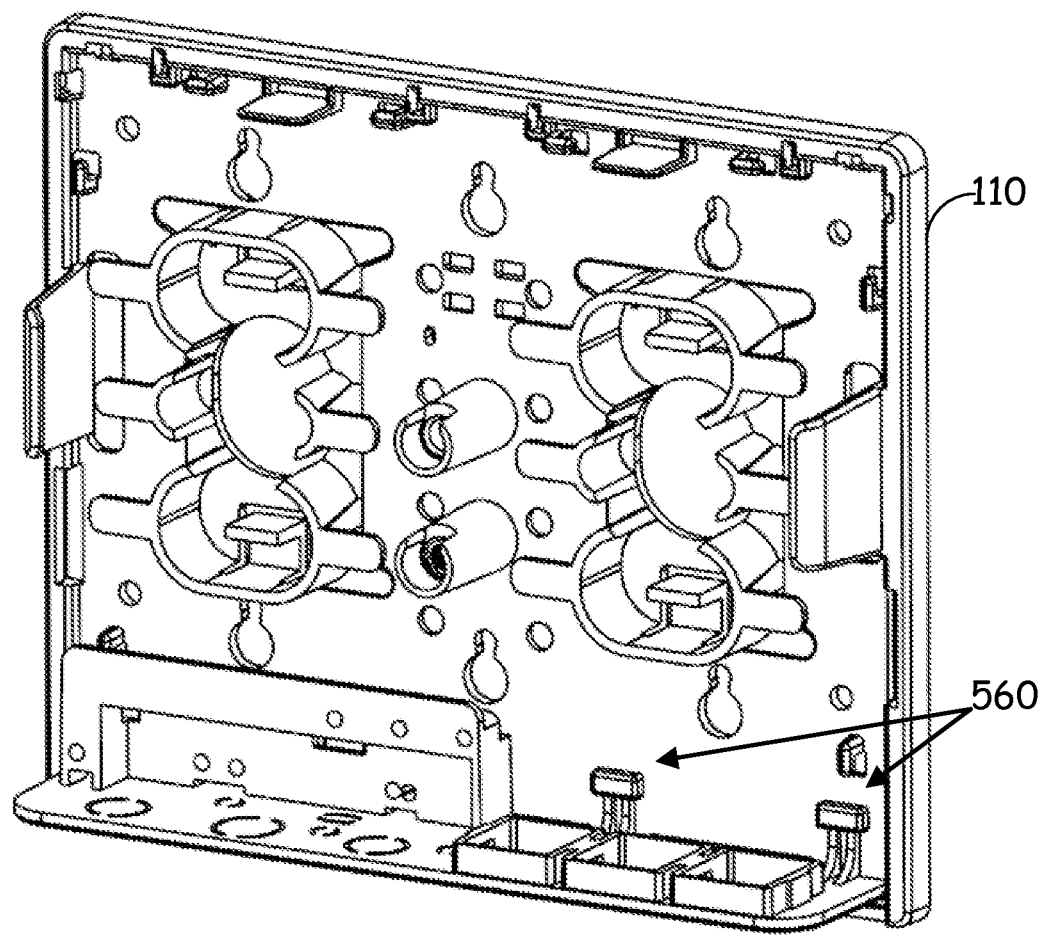
FIGS. 19 and 20 are perspective views of base plates of connectivity platform embodiments, illustrating exemplary features for securing interchangeable plates and/or modules.
Figure 20:
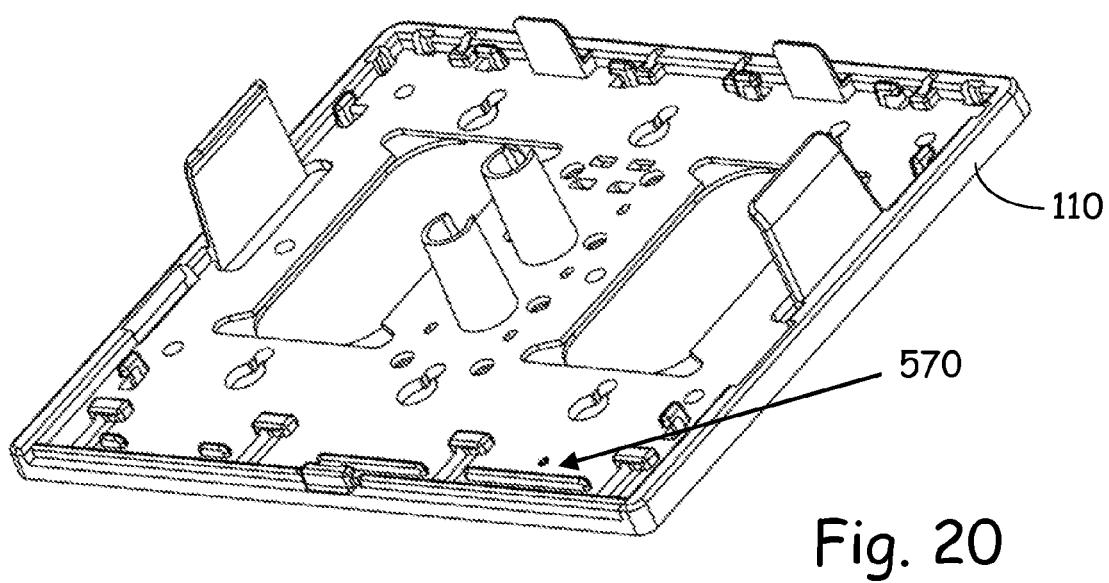

As described above, in exemplary embodiments, all interchangeable plates and modules are (or can be) configured to attach to the base plate 110 using the same latching/attaching mechanisms. These mechanisms were shown particularly with reference to the blank plate illustrated in FIG. 14. Referring now to FIG. 19, shown are slots 560 in base plate 110 which receive and hold tabs 480 shown in FIG. 14 to aid in securing the interchangeable plates to the base plate. As shown in FIG. 20, a plastic walls/slots 570 are provided in base plate 110 for holding the interchangeable plates and modules from moving.

Figure 21:
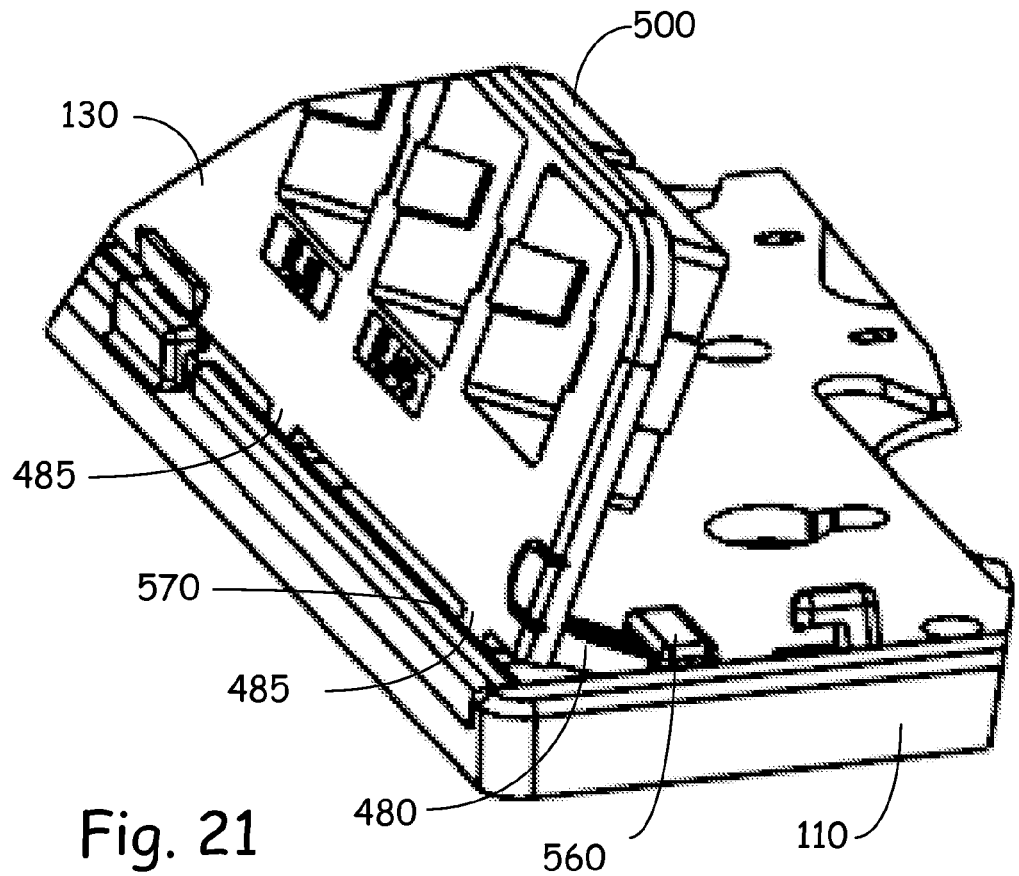
FIGS. 21 and 22 illustrate features for, and steps of, securing interchangeable plates and/or modules to a base plate.
Figure 22:
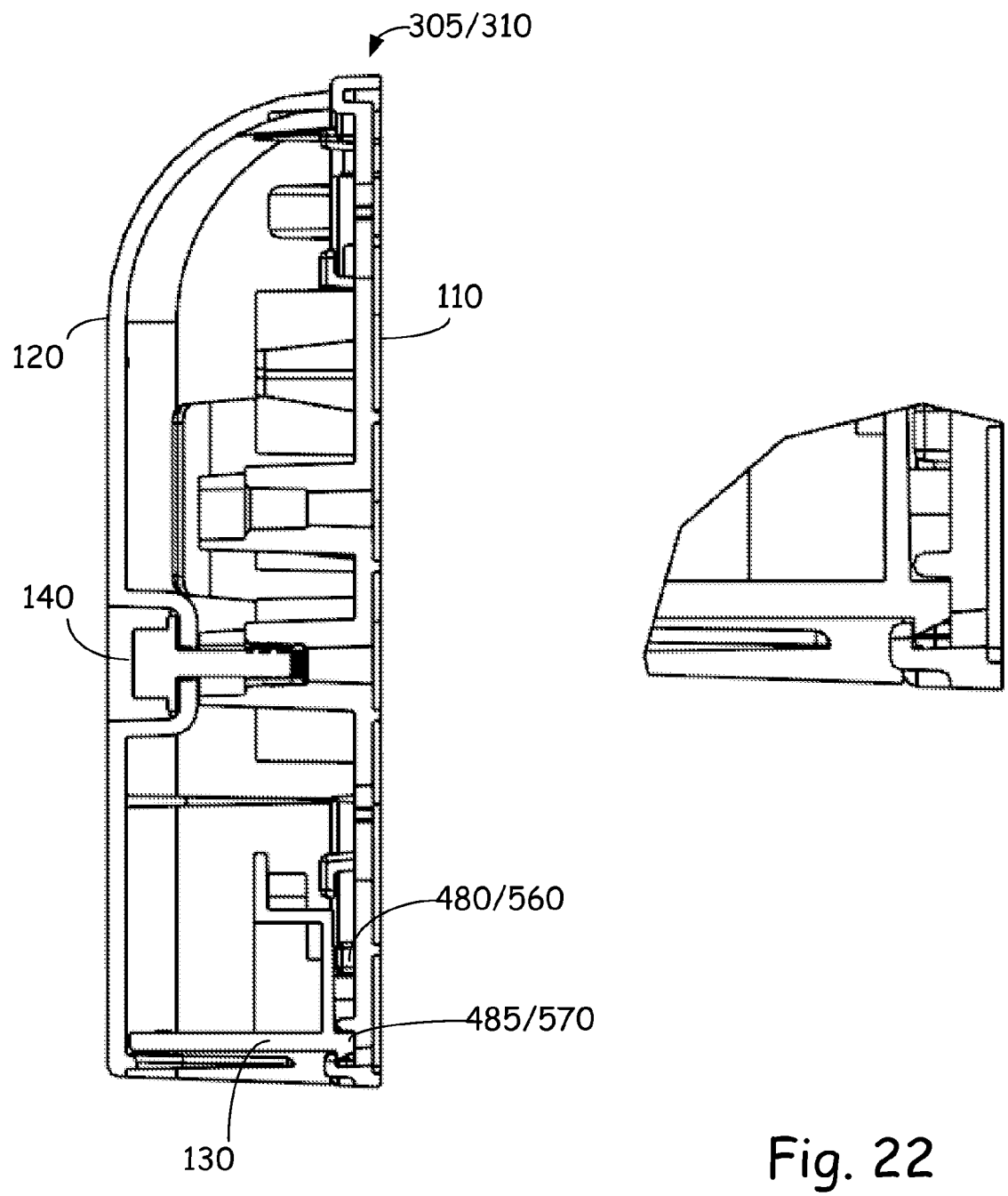

Referring now to FIG. 21, the plates/modules 130/500 are installed by first inserting the tabs 480 into the bases' slots 560 at an approximate angle of 30 degrees (from level of base) until the tabs bottom-out in the slot. The plate/module is then pressed down until the latching mechanism 485/570 is engaged. The latching of the plates/modules, and the features used to accomplish the latching, are shown further in FIG. 22.

Figure 23:
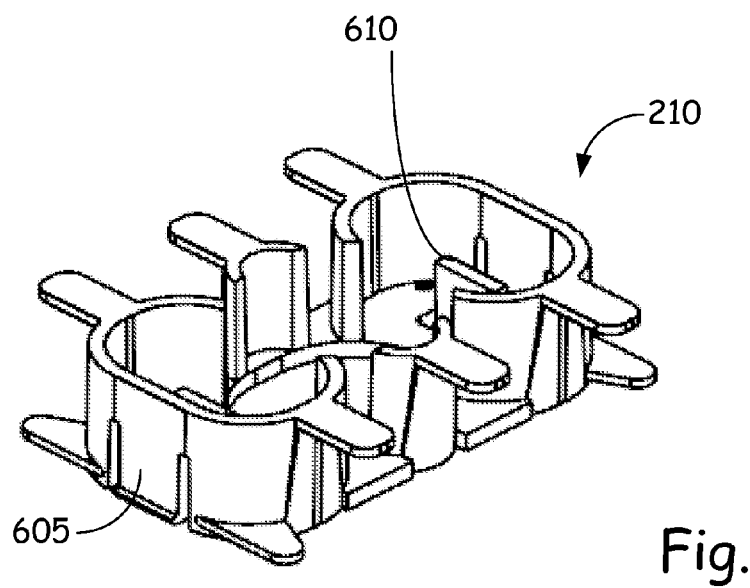
FIG. 23 is a perspective view illustrating a fiber management spool feature of the connectivity platform.
Figure 24:
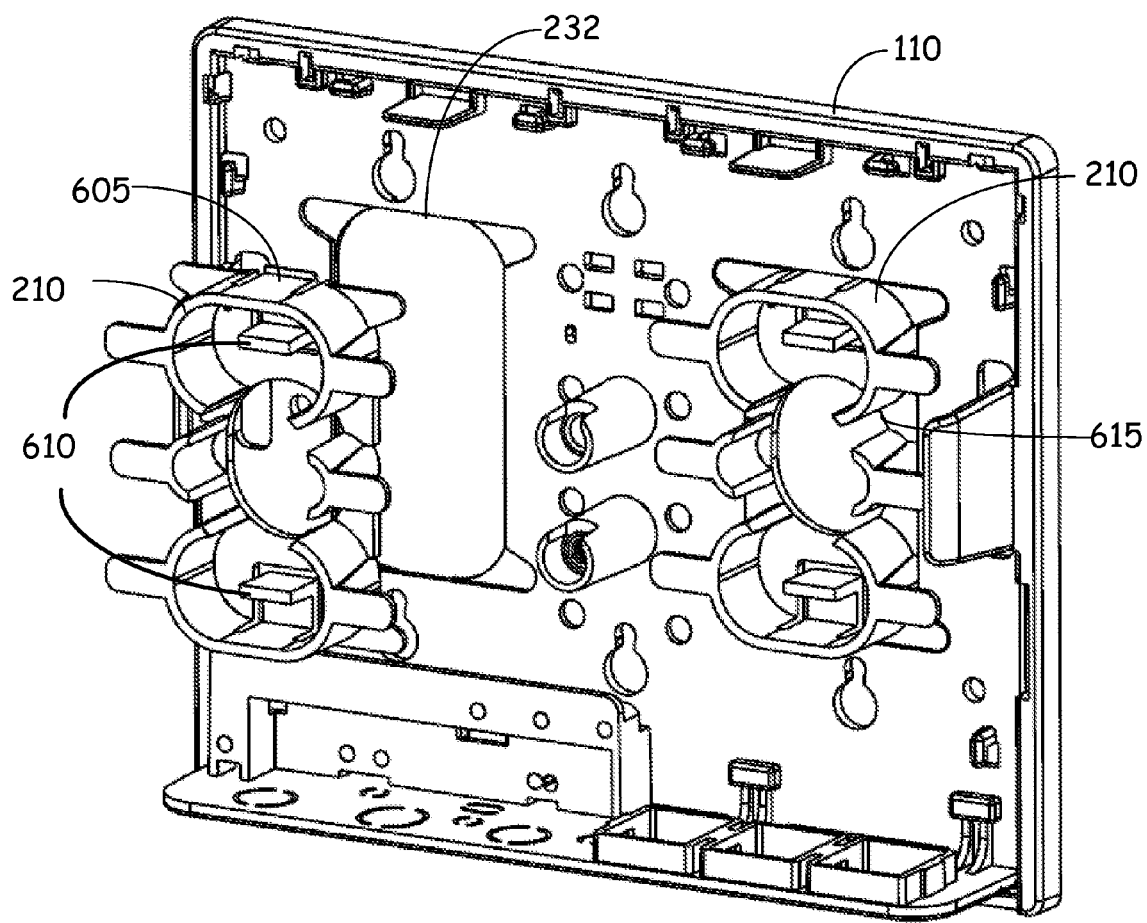
FIG. 24 is a perspective view illustrating the fiber management spool of FIG. 23 removably secured to the base plate with latch release tabs.

Referring now to FIG. 23, shown is one of fiber management spools 210 described above (e.g., with reference to FIG. 2). Fiber management spools each have a pair of latching snap fit tabs 605 which removably attach the spools to base plate 110 adjacent entry/exit apertures 232 as shown in FIG. 24. Tabs 605 snap into place in apertures 232 to secure the spools to the base plate 110. To remove a spool from base plate 110, the corresponding latch release tabs 610 are pulled or squeezed together by a user to cause slight deformation of the spool, resulting in latching tabs 605 releasing from the aperture 232. Each fiber management spool 210 includes an aperture 615 which aligns with one of the entry/exit apertures 232 in base plate 110 to allow cables from the premises (e.g., routed through the walls of the premises and exiting at a junction box covered by base plate 110) to pass into the enclosure of the connectivity platform. While allowing entry/exit of premises coax or twisted pair cables as shown in FIG. 2, spools 210 also provide convenient storage mechanisms for excess cable. In an exemplary embodiment, each of the two fiber management spools 210 can accommodate and store approximately six feet of 4.8 mm fiber cable.

Figure 25:
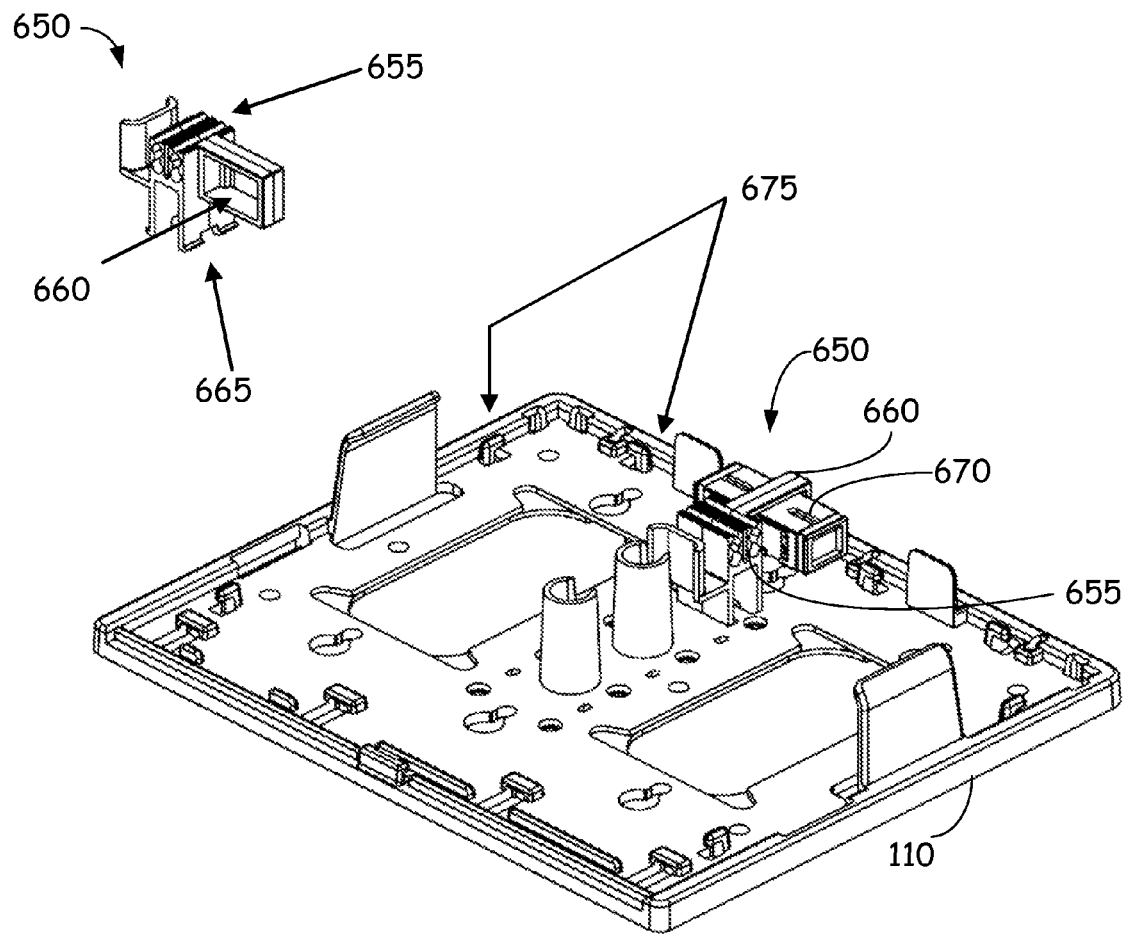
FIG. 25 is a perspective view illustrating a fiber splice chip and fiber adapter mounted to the base plate, as well as zip tie holders for aiding in cable/fiber management.
Figure 26:
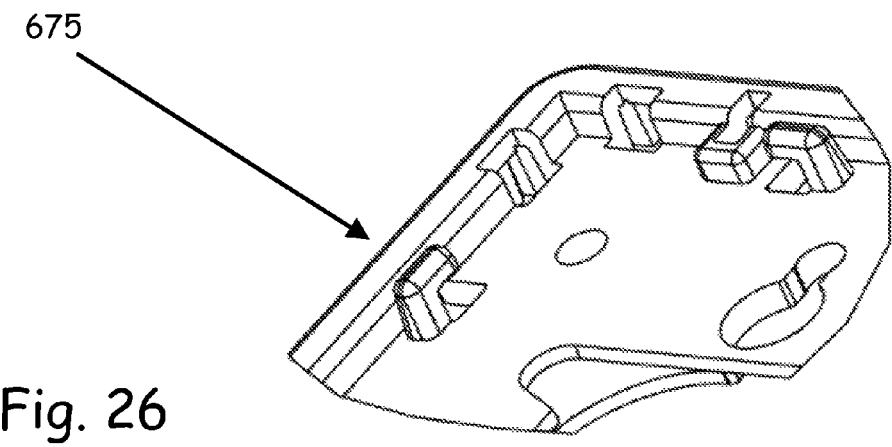
FIG. 26 is a perspective view illustrating a portion of the base plate and showing the zip tie holder in greater detail.

Referring now to FIG. 25, in some embodiments, connectivity platform further provides the option and ability of having a fiber adapter 670 or fiber splices mounted inside the connectivity platform with the use of a fiber clip 650. The fiber clip 650 features an aperture 660 configured to hold an SC adapter 670 in place, as well as an integral splice chip 655 allowing for up to four spliced fibers to be held in place. The fiber clip 650 has mounting tabs 665 that secure it to the base plate 110. Zip ties (not shown) can then be used with zip tie holders 675 to provide cable/fiber management within the connectivity platform. The zip tie holders 675 formed on base plate 110 are shown in further detail in FIG. 26.

The above-described embodiments of the disclosed connectivity platform illustrate the highly configurable and adaptable features which facilitate a wide range of triple play service networking solutions, though use of the platform is not limited to any specific type of networking solutions or to triple play services. In exemplary embodiments, the connectivity platform is a device, made of plastic or other materials, that is configured to be mounted in convenient locations and that is configured to accept multiple different signal distribution and/or conversion modules. The platform provides cable management, and offers a convenient, well organized, and protected structure for housing conversion circuitry, connectors, splitters, etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, in various embodiments, the connectivity platform can be made from materials other than plastic. Further, the various conversion and/or distribution modules can be combined in different ways than those specifically illustrated. The modules can also mount to base plate 110 in a manner different than the examples shown. Other examples of modifications of the disclosed concepts are also possible, without departing from the scope of the disclosed concepts.

What is claimed is:

1. A modular plug and play connectivity platform for use in a premises for storing, connecting and distributing data cables, comprising:
    a base plate configured to be mounted on a wall in the premises and to support one or more data distribution or conversion modules;
    at least one interchangeable plate configured to secure to a first side of the base plate and to provide interfaces for the one or more data distribution or conversion modules supported by the base plate;
    at least one spool configured to removably attach to the base plate to provide storage for excess data cable; and
    a cover hingedly connected to a second side of the base plate and connectable to the base plate by latching tabs on at least one other side whereby the cover encloses all but the first side of the base plate covering any data distribution or conversion modules supported by the base plate.

2. The connectivity platform of claim 1, wherein the base plate includes at least one entry/exit aperture configured to accept one or more data cables into the enclosure.

3. The connectivity platform of claim 1, wherein each spool is configured to removably attach to the base plate adjacent to and at least partially covering an entry/exit aperture.

4. The connectivity platform of claim 3, wherein each spool includes a spool aperture which aligns with the corresponding entry/exit aperture in the base plate to allow data cable from the wall to pass into the enclosure of the connectivity platform through the spool aperture.

5. The connectivity platform of claim 1, wherein the excess data cable is fiber optic cable, the connectivity platform further comprising a side entry in the base plate configured to receive the fiber optic cable into the connectivity platform enclosure and positioned to allow the fiber optic cable to be routed for storage around the at least one fiber management spool.

6. The connectivity platform of claim 2, wherein the at least one interchangeable plate includes a power plug configured to connect to an external source of power for powering one or more data distribution or conversion modules supported by the base plate in the connectivity platform enclosure.

7. The connectivity platform of claim 2, and further comprising the one or more data distribution or conversion module, wherein the one or more data distribution or conversion module include at least one of a fiber adapter, a twisted pair connector, a coax cable splitter, a coax cable connector, a plastic optical fiber connector, an Ethernet connector, an HPNA diplexer, an HPNA diplexer with balun, a video splitter, a POF 1×N switch, and an Ethernet 1×N switch.

8. The connectivity platform of claim 1, wherein the cover comprises at least two independently movable sections each hingedly connected to the base plate.

9. A modular plug and play connectivity platform for use in a premises for receiving fiber optic cable from a fiber optic service provider and connecting the fiber optic cable to an optical network terminal, comprising:
    a base plate configured to be mounted on a wall in the premises to form a portion of a connectivity platform enclosure, the base plate configured to support one or more data distribution or conversion modules in the enclosure, the base plate including a side entry configured to receive the fiber optic cable, from the fiber optic service provider, into the connectivity platform enclosure, wherein the base plate further includes at least one entry/exit aperture in a back portion of the baseplate configured to accept one or more data cables into the enclosure from the premises;
    at least one fiber management spool configured to removably attach to the base plate, adjacent to and at least partially covering an entry/exit aperture in the back portion of the base plate to provide storage for excess fiber optic cable from the fiber optic service provider, wherein the side entry and the at least one fiber management spool are positioned to allow the fiber optic cable to be routed for storage around the at least one fiber management spool;
    at least one interchangeable plate configured to secure to a first side of the base plate and to provide interfaces for the one or more data distribution or conversion modules;
    a cover hingedly connected to a second side of the base plate opposite the first side and connectable to the base plate by latching tabs on at least one other side whereby the cover encloses all but the first side of the base plate covering any data distribution or conversion modules supported by the base plate.

10. The connectivity platform of claim 9, wherein each fiber management spool includes a spool aperture which aligns with the corresponding entry/exit aperture in the back portion of the base plate to allow the one or more data cables to enter into the enclosure of the connectivity platform through the spool aperture.

11. The connectivity platform of claim 9, wherein the at least one interchangeable plate is configured to provide an interface for a fiber adapter capable of connecting the fiber optic cable from the fiber optic service provider to a second fiber optic cable connected to the optical network terminal inside the premises.

12. The connectivity platform of claim 11, wherein the at least one interchangeable plate includes a power plug configured to connect to an external source of power for powering one or more data distribution or conversion modules supported by the base plate in the connectivity platform enclosure.

13. The connectivity platform of claim 9, and further comprising the one or more data distribution or conversion module, wherein the one or more data distribution or conversion module include at least one of a fiber adapter, a twisted pair connector, a coax cable splitter, a coax cable connector, a plastic optical fiber connector, an Ethernet connector, an HPNA diplexer, an HPNA diplexer with balun, a video splitter, a POF 1×N switch, and an Ethernet 1×N switch.

14. The connectivity platform of claim 9, wherein the cover comprises at least two independently movable sections each hingedly connected to the base plate.

\* \* \* \* \*